United States Patent Office 2,970,960
Patented Feb. 7, 1961

2,970,960

LUBRICANT COMPOSITION CONTAINING NAPHTHENIC ACID ESTERS OF POLYMERIC POLYHYDRIC ALCOHOLS

Samuel E. Jolly, Ridley Park, Pa., assignor to Sun Oil Company, Philadelphia, Pa., a corporation of New Jersey No Drawing. Original application Nov. 27, 1953, Ser. No. 394,903, now Patent No. 2,868,761, dated Jan. 13, 1959. Divided and this application May 7, 1957, Ser. No. 657,510

5 Claims. (Cl. 252—33.4)

This invention relates to naphthenic acid esters of polymeric polyhydric alcohols.

It is known in the art to prepare polymeric polyhydric alcohols having alternate aliphatic chains and aromatic nuclei united through ether oxygen. For example, a polymer represented by the formula:

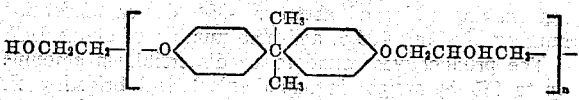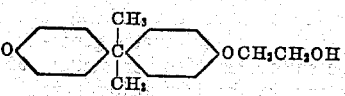

where n is, for example, 6, can be prepared by reacting epichlorohydrin with bis-phenol (p,p'-dihydroxydiphenyl dimethyl methane) in the presence of ethylene chlorohydrin and caustic soda, the mole proportions being such that the epichorohydrin and bis-phenol form the polymer unit within the brackets in the above formula, and two molecules of ethylene chlorohydrin and one molecule of bis-phenol form the end groups. Various other polymeric polyhydric alcohols of the indicated type can be prepared by reacting various polyhydric phenols with various epihalohydrins, polyepoxy compounds or polyhaloalcohols.

According to the present invention, naphthenic acid esters of the polymeric polyhydric alcohols in question are prepared. It has been found that these esters exhibit sufficient dispersibility in mineral oils such as lubricating oils to permit the preparation of valuable mineral oil compositions containing the esters. Generally, greater dispersibilities in lubricating oils can be obtained by using higher molecular weight naphthenic acids in the esterification. Preferred average molecular weights of the naphthenic acids are those above 300, though naphthenic acids having lower average molecular weights can be used.

In the preparation of the polymeric polyhydric alcohols which are esterified according to the invention, a polyhydric phenol can be reacted with an epihalohydrin, a polyepoxy compound, or polyhaloalcohol in the absence of any other compound which enters into the polymer product. Or, if desired, the reaction can be carried out in the presence of a monofunctional reactant which is capable of reacting with only one molecule of the polyhydric phenol or the other polymer-forming reactant, i.e. the epihalohydrin, polyepoxy compound, or polyhaloalcohol. When such monofunctional reactant is used, it forms the end-groups of the polymer molecules. The use of such monofunctional reactants is preferred since, by adjustment of the mole ratio of monofunctional reactant to polyfunctional reactants, the molecular weight of the polymer molecule and the number of hydroxyl groups in the polymer molecule can be regulated, greater proportions of monofunctional reactant providing lesser molecular weights and hydroxyl groups per molecule and vice versa.

The monofunctional reactant can be reactive either with the polyhydric phenol or the other polymer-forming reactant. Examples of monofunctional reactants reactive with the polyhydric phenol are ethylene chlorohydrin, glycerol monochlorohydrin, erythritol monochlorohydrin, mannitol monochlorohydrin, sorbitol monochlorohydrin, ethylene oxide, propylene oxide, glycidol, dimethyl sulfate, diethyl sulfate, etc. Examples of monofunctional reactants reactive with the other polymer-forming reactant are phenol, alkyl phenols, etc.

When phenol is used as monofunctional reactant in the reaction of bis-phenol and epichlorohydrin, the product obtained is:

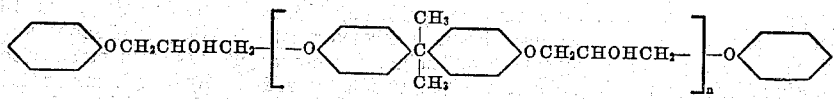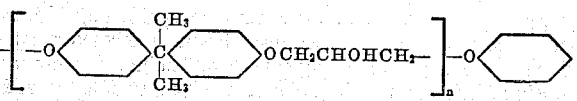

where n is, for example, 7.

In the polymeric alcohols esterified according to the invention, there are preferably hydroxyalkyl groups and hydrocarbon groups containing aromatic nuclei united through ether linkages. For example, the polymer described in the preceding paragraph has alternate monohydroxy trimethylene groups and diphenyl dimethyl methane groups united by ether linkages between the aromatic nuclei and the terminal methylene groups of the monohydroxy trimethylene groups. The number of carbon atoms in each hydroxyalkyl group is preferably within the range from 3 to 6. The number of carbon atoms in the hydrocarbon group containing the aromatic nucleus or nuclei is preferably within the range from 6 to 20. The number of hydroxyl groups in the polymeric alcohols is generally within the range from 3 to 20.

Various polyhydric phenols can be used to prepare the polymeric polyhydric alcohols. Examples of suitable polyhydric phenols are mononuclear polyhydric phenols such as resorcinol, hydroquinone, catechol, phloroglucinol, etc., and polynuclear polyhydric phenols such as bisphenol, p,p'-dihydroxybenzophenone, p,p'-dihydroxydiphenyl, p,p'-dihydroxydibenzyl, o,p,o',p'-tetrahydroxydiphenyl dimethyl methane, hematoxylin, polyhydric anthracenes, polyhydric naphthalenes, etc.

Examples of suitable epihalohydrins that may be used are epichlorohydrin, epibromohydrin, epihalohydrins of mannitol, epihalohydrins of sorbitol, epihalohydrins of erythritol, etc. Examples of suitable polyhaloalcohols are glycerol dichlorohydrin, beta-methyl glycerol dichlorohydrin, mannitol dichlorohydrin, sorbitol dichlorohydrin. Examples of suitable polyepoxy compounds are bis-(2,3-epoxypropyl) ether, butylene dioxide, mannitol diepoxide, sorbitol diepoxide, etc.

The preparation of the polymeric polyhydric alcohols in question is known in the art. Generally, it involves reaction of the polyhydric phenol and other polymer-forming reactant, e.g. epichlorohydrin, a monofunctional reactant being present if desired, at an elevated temperature, e.g. about 100° C., for a substantial period of time, e.g. about 2 hours. When the other polymer-forming reactant contains halogen atoms which are split out in the reaction, the reaction is generally performed in the presence of a strong base, e.g. caustic soda, which is neutralized after the completion of the reaction, the salt water formed being then removed from the polymer product.

The esterification of the polymeric polyhydric alcohol can be accomplished by reacting the alcohol with naphthenic acids at an elevated temperature, e.g. about 200° C. to 300° C., under refluxing conditions with removal of water by means of a water trap. The esterification may be conducted if desired in the presence of an inert gas such as nitrogen or carbon dioxide. A solvent, e.g. petroleum spirits, can be employed in the esterification if desired. Instead of naphthenic acids, the corresponding acid chloride or anhydride can be employed. Approximately stoichiometric amounts of the reactant can be employed, or an excess of either reactant can be employed and the excess reactant separated, e.g., by distillation, from the ester product.

The esters of the invention are useful in a variety of applications. They may be used as components of varnish compositions and other coating compositions, or as components of mineral oil compositins. The esters are used to advantage as components of compositions containing mineral lubricating oil and petroleum sulfonates. Such compositions are well suited for use as slushing oils, lubricating oils, etc. The sulfonates and esters according to the invention impart highly desirable anticorrosive properties to the oil. Preferred compositions of this type are those containing about 1% to 10% by weight of oil-soluble sulfonates and 0.1% to 1.0% by weight of the esters according to the invention. Suitable sulfonates include the sodium, potassium, lithium, calcium, strontium and barium salts of petroleum sulfonates. Alkali metal and alkaline earth metal sulfonates generally are suitable, as well as sulfonates of other metals. Preferred mineral oils for use in the compositions in question are those having S.U. viscosity at 100° F. within the range from 100 to 1600.

The esters according to the invention can be copolymerized with vinyl aromatic compounds such as styrene to give products having increased resistance to water and alkali. Such copolymerization can be effected by contacting the esters and the vinyl aromatic compound under conditions normally productive of polymerization of the vinyl aromatic compound.

The monovinyl aromatic compound employed according to the invention is one having the following formula:

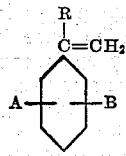

where R is hydrogen, methyl, or ethyl, A is hydrogen or halogen or an alkyl radical having not more than three carbon atoms, and B is hydrogen or halogen or an alkyl radical having not more than three carbon atoms. Examples of suitable monovinyl aromatic compounds are styrene, o-methyl styrene, p-methyl styrene, o-ethyl styrene, p-ethyl styrene, o,p-dimethyl styrene, o,p-diethyl styrene, p-chlorostyrene, m-chlorostyrene, o-methyl-p-chlorostyrene, o-ethyl - p - chlorostyrene, o-methyl-p-isopropyl styrene, alpha-methyl styrene, p-methyl-alpha-methyl styrene, alpha-ethyl styrene, o,p-dimethyl-alpha-methyl styrene, m-chloro-alpha-methyl styrene, p-chloro-alpha-methyl styrene, p-isopropyl-alpha-methyl styrene, m-chloro - p - methyl - alpha - methyl styrene, mixtures of monovinyl aromatic compounds, etc.

The relative proportions of vinyl compound and esters in the copolymerization mixture will generally be in the range from 10 to 150 parts by weight, preferably 20 to 80 parts by weight, of vinyl compound per 100 parts of the esters. The vinyl compound is preferably added dropwise to the polymerization mixture during the reaction.

Any suitable known conditions for polymerization of styrene can be employed. For example, the mixture can be maintained at an elevated temperature, preferably at least 100° C. and preferably at a temperature and pressure such that the styrene is in liquid phase, in the presence of a polymerization catalyst such as ditertiary butyl peroxide, benzoyl peroxide, hydrogen peroxide, tertiary butyl hydroperoxide, acetyl benzoyl peroxide, tertiary butyl perbenzoate, etc. The use of a catalyst is not strictly necessary, but is preferred according to the invention. The time required to obtain a suitable degree of polymerization depends on the temperature, and will generally be within the range from 5 to 50 hours.

The following examples illustrate the invention:

*Example I*

Naphthenic acid esters of a bis-phenol epichlorohydrin condensation product were prepared. The naphthenic acids used had saponification number of 217 mg. of KOH per gram and acid number of 208 mg. of KOH per gram, indicating average molecular weight in the neighborhood of 270. The condensation product used is known by the trademark "Epon 1004" and has an average molecular weight of about 1400 and a combining weight of about 174 with monocarboxylic acids, the average number of hydroxyls and potentials hydroxyls per molecule being about eight. Epon 1004 is a hard, amber resin having melting point of about 75–80° C.

100 grams of naphthenic acids and 100 grams of Epon 1004 were reacted at 280° C. in an atmosphere of nitrogen for about 15 hours. The reaction product was a homogeneous hard, darker amber resinous material having melting point of about 51–59° C., saponification number of about 105.6, and acid number of about 19.7.

The product was found to be dispersible in amounts up to 1% by weight in naphthenic base lubricating oil having S.U. viscosity at 100° F. of about 100 seconds. The Epon 1004 prior to esterification, on the other hand, is not dispersible to any appreciable extent in such lubricating oil.

This example shows that naphthenic acid esters of bis-phenol epichlorohydrin condensation products can be prepared, which esters have substantially greater dispersibility in lubricating oil than the condensation product prior to esterification.

*Example II*

Another sample of the same naphthenic acids used in Example I was reacted with another sample of Epon 1004. 100 grams of naphthenic acids, 100 grams of Epon 1004, and 100 grams of petroleum spirits were refluxed at 170° C. in an atmosphere of nitrogen for 21 hours. Spirits were stripped from the reaction product at 205° C. to obtain a homogeneous product resembling the product of Example I and having melting point of 48–52° C., saponification number of 106.4, and acid number of 21.5.

This example shows that the esterification can be carried out in the presence of a solvent with generally similar results.

*Example III*

A reaction product obtained in a manner similar to that described in Example II was reacted with styrene under polymerizing conditions to produce styrenated naphthenic acid esters of a bis-phenol epichlorohydrin condensation product. A solution of the reaction product in 100 grams of spirits was heated at 170° C., and 100 grams of styrene containing 3 grams of ditertiary butyl peroxide were added dropwise with stirring. After addition of 100 grams of styrene, the reaction mixture was maintained at 170° C. for 7 hours. Solvent and unreacted styrene were stripped off, and the remaining product blown with nitrogen.

The reaction product was a homogeneous, yellow, brittle solid having melting point of 63–73° C., saponification number of 73.5, and acid number of 7.9.

This example shows that naphthenic acid esters of bisphenol epichlorohydrin condensation products can be styrenated to product materials having modified and advantageous properties.

*Example IV*

The following composition was prepared:

|  | Parts (wt.) |
|---|---|
| Mineral lubricating oil | 94 |
| Sodium sulfonates | 5 |
| Naphthenic acid ester of Epon 1004 (prepared as described in Example II) | 1 |

This composition was a stable, homogeneous dispersion of sulfonates and ester in lubricating oil.

The rust-inhibiting properties of this composition were tested by placing a film of the composition on a plate of sand-blasted A.S.T.M. 1020 low carbon steel, and maintaining the latter in an atmosphere of 100% humidity at 100° F. for 300 hours. At the end of this period, no rust was visible on the plate. These results indicate the superior rust-inhibiting properties of the composition.

Naphthenic acid esters according to the present invention include both esters of naturally occurring petroleum naphthenic acids and esters of carboxylic acids obtained by partial oxidation of petroleum hydrocarbon fractions containing substantial quantities, e.g. at least 20 weight percent, and preferably at least a major proportion, of compounds containing at least one naphthene ring. Typical oxidation conditions which may be employed in partial oxidation include: temperature 200° F. to 300° F.; pressure atmospheric to 500 p.s.i.g.; oxidizing agent, air, oxygen, ozone, ozonized air, $H_2O_2$, etc.; catalyst, if any, of the well known metal oxidation catalyst type, e.g. manganese, naphthenate, etc. If desired, any suitable means can be employed to separate carboxylic acid oxidation products from unoxidized hydrocarbons and from other oxidation products.

This application is a division of copending application Serial No. 394,903, filed November 27, 1953, by the same inventor, now Patent No. 2,868,761, issued January 13, 1959.

The invention claimed is:

1. A new composition of matter consisting essentially of mineral lubricating oil containing 0.1 to 10 weight percent of alkali metal petroleum sulfonates, and having dispersed therein 0.1 to 1.0 weight percent of petroleum naphthenic acid esters of glyceryl polyethers of polyhydric phenols, which polyethers in unesterified form are not appreciably dispersible in petroleum lubricating oil, said polyethers having alternate hydroxyalkylene radicals and aromatic radicals united through ether oxygen, the hydroxyalkylene groups containing 3 to 6 carbon atoms and the aromatic radicals containing 6 to 20 carbon atoms, said polyethers containing 3 to 20 hydroxyl groups per molecule, and said esters being obtained by reacting said polyethers with naphthenic acids, which acids have average molecular weight of at least 270, the amount of said acids being in the range from an equal amount by weight to that of said polyethers to a stoichiometric amount for reaction with all hydroxyl groups of said polyethers.

2. Composition according to claim 1 wherein said esters are obtained from naphthenic acids, said acids having average molecular weight above 300.

3. Composition according to claim 1 wherein said aromatic radicals are diphenyl dimethyl methane radicals.

4. Composition according to claim 1 wherein said polyethers have average molecular weight of about 1400.

5. Composition according to claim 1 wherein said polyethers contain about 8 hydroxyl groups per molecule.

References Cited in the file of this patent

UNITED STATES PATENTS

| 2,173,117 | Johnson | Sept. 19, 1939 |
| 2,672,444 | Wasson et al. | Mar. 16, 1954 |
| 2,681,315 | Tongberg et al. | June 15, 1954 |